United States Patent
Nakasaku et al.

(10) Patent No.: US 7,397,771 B2
(45) Date of Patent: Jul. 8, 2008

(54) COMMUNICATION TERMINAL AND COMMUNICATION METHOD

(75) Inventors: Yukiyoshi Nakasaku, Kawasaki (JP); Hiroshi Takano, Kawasaki (JP); Hitoshi Nakanishi, Kawasaki (JP); Yasuyuki Sayama, Kawasaki (JP); Yuichi Tashiro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 673 days.

(21) Appl. No.: 11/087,014

(22) Filed: Mar. 22, 2005

(65) Prior Publication Data

US 2005/0163091 A1 Jul. 28, 2005

Related U.S. Application Data

(63) Continuation of application No. PCT/JP03/03593, filed on Mar. 25, 2003.

(51) Int. Cl.
*H04L 12/28* (2006.01)
*H04B 3/36* (2006.01)
*H04Q 7/00* (2006.01)

(52) U.S. Cl. .................. 370/254; 370/293; 370/328

(58) Field of Classification Search ................ 370/254, 370/255, 277–279, 285, 293, 312, 315, 328, 370/338, 351, 389, 400, 401
See application file for complete search history.

(56) References Cited

U.S. PATENT DOCUMENTS

| 5,412,654 | A | * | 5/1995 | Perkins ..................... 370/312 |
| 5,987,011 | A | * | 11/1999 | Toh ............................ 370/331 |
| 6,704,283 | B1 | * | 3/2004 | Stiller et al. ................ 370/238 |
| 6,836,463 | B2 | * | 12/2004 | Garcia-Luna-Aceves et al. .......................... 370/238 |
| 6,867,708 | B2 | * | 3/2005 | Darby et al. ................ 340/933 |
| 2002/0145978 | A1 | * | 10/2002 | Batsell et al. .............. 370/238 |
| 2004/0213167 | A1 | * | 10/2004 | Garcia-Luna-Aceves et al. .......................... 370/254 |
| 2005/0088980 | A1 | * | 4/2005 | Olkkonen et al. ........... 370/255 |
| 2005/0286464 | A1 | * | 12/2005 | Saadawi et al. ............. 370/328 |

FOREIGN PATENT DOCUMENTS

| EP | 1 134 939 | 9/2001 |
| EP | 1 255 380 | 11/2002 |
| JP | 11-239176 | 8/1999 |
| JP | 2000-252992 | 9/2000 |
| JP | 2000-341323 | 12/2000 |
| JP | 2001-268128 | 9/2001 |
| JP | 2002-368789 | 12/2002 |

OTHER PUBLICATIONS

International Search Report dated Aug. 5, 2003.

* cited by examiner

*Primary Examiner*—Wing F. Chan
*Assistant Examiner*—Hong Sol Cho
(74) *Attorney, Agent, or Firm*—Katten Muchin Rosenman LLP (57) ABSTRACT

A communication terminal that builds a wireless network includes a control-information transceiver that transmits and receives control information indicating number of times of forwarding required for a communication with the communication terminal, with respect to other communication terminals connected to the wireless network; a routing-information creating unit that creates, based on the control information received, routing information indicating an initial forward-destination terminal to which data is firstly transmitted when the communication terminal is a destination, for each of the other communication terminals; and a data transmitting unit that transmits the data based on the routing information.

12 Claims, 11 Drawing Sheets

FIG.3A  ROUTING TABLE FOR TERMINAL A

| DESTINATION TERMINAL | INITIAL FORWARD DESTINATION TERMINAL | NUMBER OF TIMES OF FORWARDING |
|---|---|---|
| A | — | 0 |
| B | B | 1 |
| C | B | 2 |
| D | B | 3 |
| E | B | 3 |

FIG.3B  ROUTING TABLE FOR TERMINAL B

| DESTINATION TERMINAL | INITIAL FORWARD DESTINATION TERMINAL | NUMBER OF TIMES OF FORWARDING |
|---|---|---|
| A | A | 1 |
| B | — | 0 |
| C | C | 1 |
| D | C | 2 |
| E | C | 2 |

FIG.3C  ROUTING TABLE FOR TERMINAL C

| DESTINATION TERMINAL | INITIAL FORWARD DESTINATION TERMINAL | NUMBER OF TIMES OF FORWARDING |
|---|---|---|
| A | B | 2 |
| B | B | 1 |
| C | — | 0 |
| D | D | 1 |
| E | E | 1 |

FIG.3D  ROUTING TABLE FOR TERMINAL D

| DESTINATION TERMINAL | INITIAL FORWARD DESTINATION TERMINAL | NUMBER OF TIMES OF FORWARDING |
|---|---|---|
| A | C | 3 |
| B | C | 2 |
| C | C | 1 |
| D | — | 0 |
| E | C | 2 |

FIG.3E  ROUTING TABLE FOR TERMINAL E

| DESTINATION TERMINAL | INITIAL FORWARD DESTINATION TERMINAL | NUMBER OF TIMES OF FORWARDING |
|---|---|---|
| A | C | 3 |
| B | C | 2 |
| C | C | 1 |
| D | C | 2 |
| E | — | 0 |

FIG.4A

CONTROL INFORMATION FOR TERMINAL A

| SOURCE TERMINAL | | | B |
|---|---|---|---|
| DESTINATION TERMINAL | 1 | TERMINAL | D |
| | | NUMBER OF TIMES OF FORWARDING | 3 |
| | 2 | TERMINAL | C |
| | | NUMBER OF TIMES OF FORWARDING | 2 |
| | 3 | TERMINAL | B |
| | | NUMBER OF TIMES OF FORWARDING | 1 |

FIG.4B

TRANSMISSION DATA

| ID | 1028 |
|---|---|
| DESTINATION TERMINAL | D |
| SOURCE TERMINAL | A |
| NUMBER OF HOPS | 3 |
| DATA | ＊＊＊＊＊＊ |

FIG.10A
BEFORE TERMINAL C MOVES

FIG.10B
AFTER TERMINAL C MOVES

FIG. 12A  ROUTING TABLE FOR TERMINAL A

| DESTINATION TERMINAL | INITIAL FORWARD DESTINATION TERMINAL | NUMBER OF TIMES OF FORWARDING |
|---|---|---|
| A | — | 0 |
| B | B | 1 |
| C | B | 2 |
| D | B | 3 |

FIG. 12B  ROUTING TABLE FOR TERMINAL B

| DESTINATION TERMINAL | INITIAL FORWARD DESTINATION TERMINAL | NUMBER OF TIMES OF FORWARDING |
|---|---|---|
| A | A | 1 |
| B | — | 0 |
| C | C | 1 |
| D | C | 2 |

FIG. 12C  ROUTING TABLE FOR TERMINAL C

| DESTINATION TERMINAL | INITIAL FORWARD DESTINATION TERMINAL | NUMBER OF TIMES OF FORWARDING |
|---|---|---|
| A | B | 2 |
| B | B | 1 |
| C | — | 0 |
| D | D | 1 |

FIG. 12D  ROUTING TABLE FOR TERMINAL D

| DESTINATION TERMINAL | INITIAL FORWARD DESTINATION TERMINAL | NUMBER OF TIMES OF FORWARDING |
|---|---|---|
| A | C | 3 |
| B | C | 2 |
| C | C | 1 |
| D | — | 0 |

⇑

| DESTINATION TERMINAL | INITIAL FORWARD DESTINATION TERMINAL | NUMBER OF TIMES OF FORWARDING |
|---|---|---|
| A | — | 0 |
| B | B | 1 |
| C | C | 1 |
| D | C | 2 |

⇑

| DESTINATION TERMINAL | INITIAL FORWARD DESTINATION TERMINAL | NUMBER OF TIMES OF FORWARDING |
|---|---|---|
| A | A | 1 |
| B | B | 1 |
| C | — | 0 |
| D | D | 1 |

⇑

| DESTINATION TERMINAL | INITIAL FORWARD DESTINATION TERMINAL | NUMBER OF TIMES OF FORWARDING |
|---|---|---|
| A | C | 2 |
| B | C | 2 |
| C | C | 1 |
| D | — | 0 |

COMMUNICATION TERMINAL AND COMMUNICATION METHOD

CROSS-REFERENCE TO RELATED APPLICATION

This application is a continuation of International Application PCT/JP03/03593, filed on Mar. 25, 2003, now pending, the contents of which are herein wholly incorporated by reference.

BACKGROUND OF THE INVENTION

1) Field of the Invention

The present invention relates to a communication terminal that builds a wireless network and a communication method by which the communication terminal performs a communication, and more particularly, to a communication terminal and a communication method capable of efficiently optimizing a data transmission route even under a situation in which a communication terminal moves or a new communication terminal is connected to the wireless network.

2) Description of the Related Art

A technology for data transmission or data reception through an ad hock network is widely known. The ad hock network is one of wireless networks and is not dependent on infrastructure such as base stations. The ad hock network is built by communication terminals mutually connected wirelessly.

Each of the communication terminals connected to the ad hock network includes a function of relaying data for the other destination communication terminals. Therefore, even if a distance up to a communication terminal as a destination of data is such a long distance that radio waves do not reach and data is impossible to be directly transmitted, the data is relayed through some communication terminals, which makes it possible to transmit the data to the communication terminal as a destination.

In the technology, when a communication terminal is to transmit data, a communication route up to a destination communication terminal needs to be ensured. Therefore, the communication terminal that is to transmit data transmits control information to other unspecified communication terminals. A communication terminal receives the control information, enters information for a data transmission route between a source communication terminal and its own (local) communication terminal in the control information, and transmits the control information to other unspecified communication terminals.

When control information is transmitted one after another between communication terminals and the control information reaches a destination communication terminal, a data transmission route from a source communication terminal to a destination communication terminal is built, and data is transmitted based on transmission route information entered in the control information.

In the ad hock network, however, a communication terminal included in the data transmission route may be disconnected from the ad hock network because the communication terminal deviates from a range where radio communication is possible or the power is shut off, which may cause data communication to be impossible. In this case, in the conventional technology represented in Japanese Patent Application Laid-Open No. 2000-252992, if it is detected that the data cannot be transmitted, the control information is transmitted again to ensure a new transmission route.

In the conventional technology, however, even if a destination communication terminal moves to allow data transmission to be possible through the less number of times of relay, the data transmission route cannot be updated if the transmission route having been once ensured can still be used. Japanese Patent Application Laid-Open No. 2000-341323 discloses a wireless ad hock terminal that periodically transmits control information between a relay communication terminal that performs relay and a destination communication terminal, and that establishes a connection with a relay communication terminal near the location to which the destination communication terminal has moved.

However, in the conventional technology disclosed in Japanese Patent Application Laid-Open No. 2000-341323, updating a communication route based on control information periodically transmitted is performed only between a destination communication terminal and a final relay communication terminal that relays data to the destination communication terminal, and therefore, another transmission route cannot be optimized.

More specifically, in the ad hock network, not only a destination communication terminal but also a relay communication terminal freely moves. Even if an effective transmission route with the less number of times of relay becomes available as a result of movement of the relay communication terminal, this transmission route cannot be used.

If a new communication terminal is connected to the ad hock network, a data transmission route with the less number of times of relay may be available, but such a transmission route cannot effectively be searched for.

SUMMARY OF THE INVENTION

It is an object of the present invention to solve at least the above problems in the conventional technology.

A communication terminal according to one aspect of the present invention, which builds a wireless network, includes a control-information transceiver that transmits and receives control information indicating number of times of forwarding required for a communication with the communication terminal, with respect to other communication terminals connected to the wireless network; a routing-information creating unit that creates, based on the control information received, routing information indicating an initial forward-destination terminal to which data is firstly transmitted when the communication terminal is a destination, for each of the other communication terminals; and a data transmitting unit that transmits the data based on the routing information. The control information includes source-terminal identifying information indicating a communication terminal that transmitted the control information, terminal identifying information indicating a data-transmission destination terminal that is a destination of data transmission, and the number of times of forwarding required for transmitting the control information from the data-transmission destination terminal to the communication terminal. The control information transceiver transmits the control information in which the destination of data transmission is set to the communication terminal at a predetermined time interval, rewrites the identifying information for the communication terminal with source-terminal identifying information in the control information received from other communication terminal, and forwards the control information after adding one to the number of times of forwarding.

A communication method according to another aspect of the present invention, with which a communication terminal that builds a wireless network performs a communication, includes transmitting and receiving control information indicating number of times of forwarding required for a communication with the communication terminal, with respect to other communication terminals connected to the wireless network; creating, based on the control information received, routing information indicating an initial forward-destination terminal to which data is firstly transmitted when the communication terminal is a destination, for each of the other communication terminals; and transmitting the data based on the routing information. The control information includes source-terminal identifying information indicating a communication terminal that transmitted the control information, terminal identifying information indicating a data-transmission destination terminal that is a destination of data transmission, and the number of times of forwarding required for transmitting the control information from the data-transmission destination terminal to the communication terminal. The transmitting and receiving includes transmitting the control information in which the destination of data transmission is set to the communication terminal at a predetermined time interval; rewriting the identifying information for the communication terminal with source-terminal identifying information in the control information received from other communication terminal; and forwarding the control information after adding one to the number of times of forwarding.

The other objects, features, and advantages of the present invention are specifically set forth in or will become apparent from the following detailed description of the invention when read in conjunction with the accompanying drawings.

DETAILED DESCRIPTION

Exemplary embodiments of a communication terminal and a communication method according to the present invention are explained in detail below with reference to the accompanying drawings.

Figure 1:
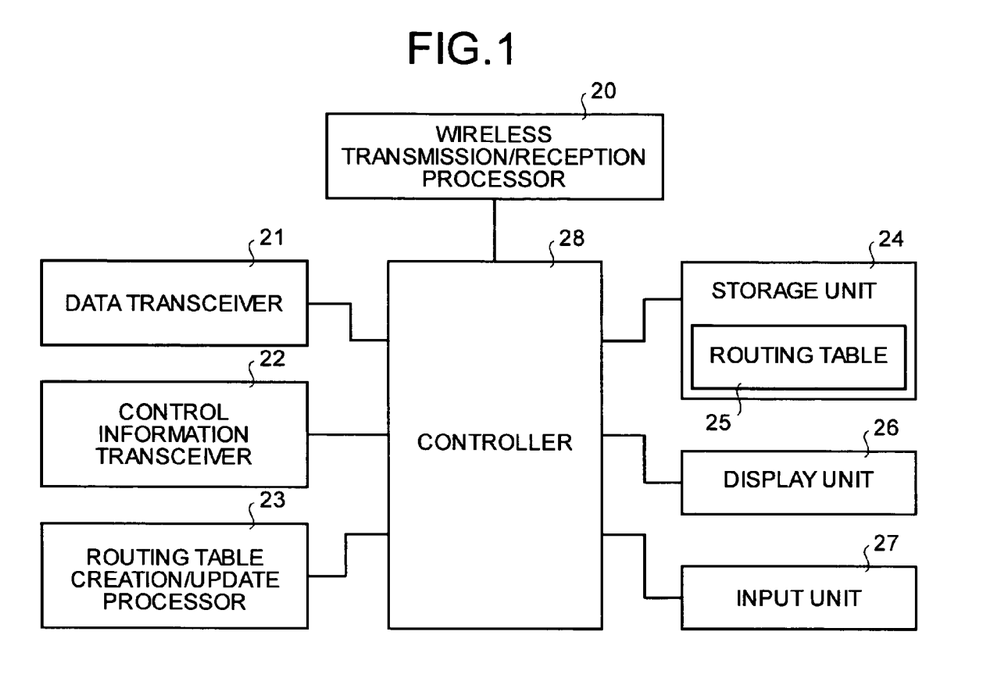
FIG. 1 is a block diagram of a functional configuration of a communication terminal according to an embodiment of the present invention.

FIG. 1 is a block diagram of the functional configuration of the communication terminal according to an embodiment of the present invention. The communication terminal can be personal computers, personal digital assistants (PDAs), or cellular phones, which can be mutually connected wirelessly.

As shown in FIG. 1, the communication terminal includes a wireless transmission/reception processor 20, a data transceiver 21, a control information transceiver 22, a routing table creation/update processor 23, a storage unit 24, a display unit 26, an input unit 27, and a controller 28.

The wireless transmission/reception processor 20 connects its own terminal to an ad hock network including a plurality of communication terminals, and causes transmission/reception of data and control information to be performed between the own terminal and other communication terminals.

The data transceiver 21 transmits or receives data to or from another communication terminal through the wireless transmission/reception processor 20. The control information transceiver 22 transmits or receives control information used to build a data transmission route through the wireless transmission/reception processor 20.

The routing table creation/update processor 23 creates a routing table 25 that is stored in the storage unit 24, and updates the routing table 25 based on the control information received. The storage unit 24 is a storage device such as a hard disk drive and a flash memory, and stores the routing table 25 in which routing information for transmission routes along which data is transmitted is entered. The routing table 25 is explained in detail later.

The display unit 26 is a display device such as a liquid crystal display. The input unit 27 is an input device such as a keyboard and a pen-type input device. The controller 28 controls the whole of the communication terminal.

Figure 2:
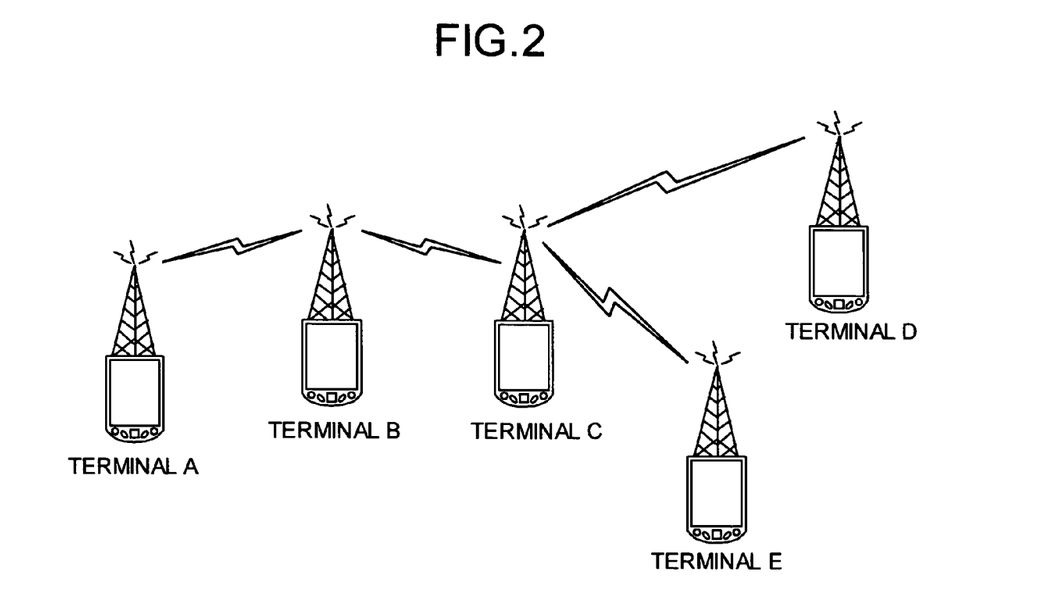
FIG. 2 is a diagram of setting used to explain data structures of routing table, control information, and transmission data.
Figure 3A:
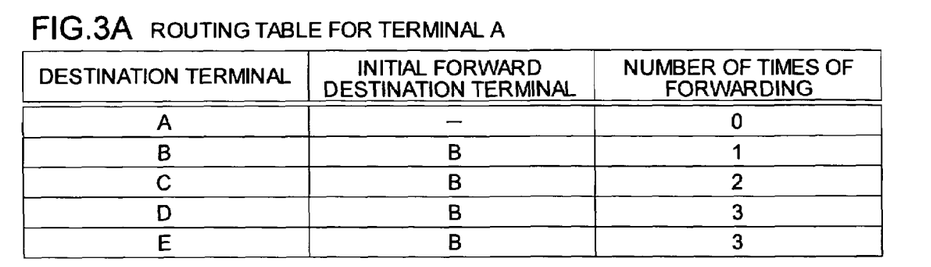
FIGS. 3A to 3E are diagrams of data structures of routing tables for communication terminals.
Figure 3B:
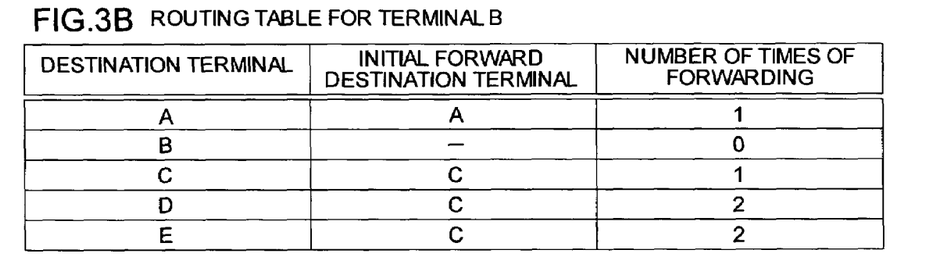
Figure 3C:
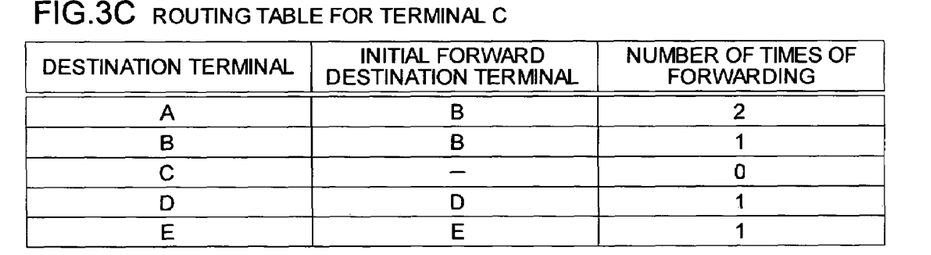
Figure 3D:
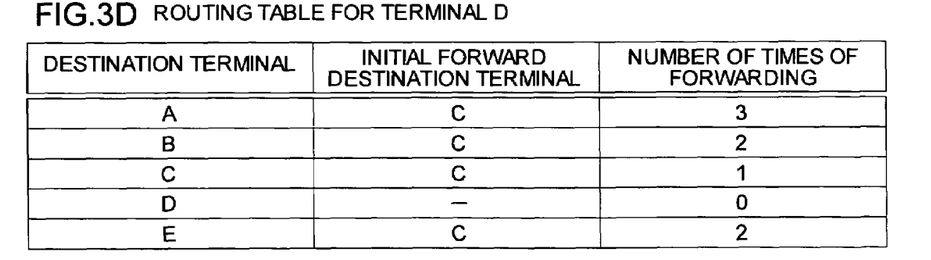
Figure 3E:
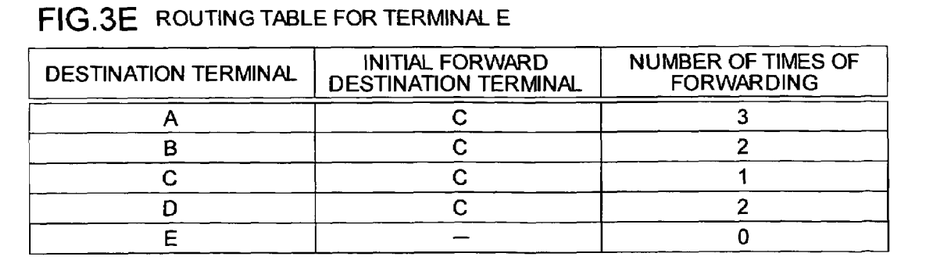
Figure 4A:
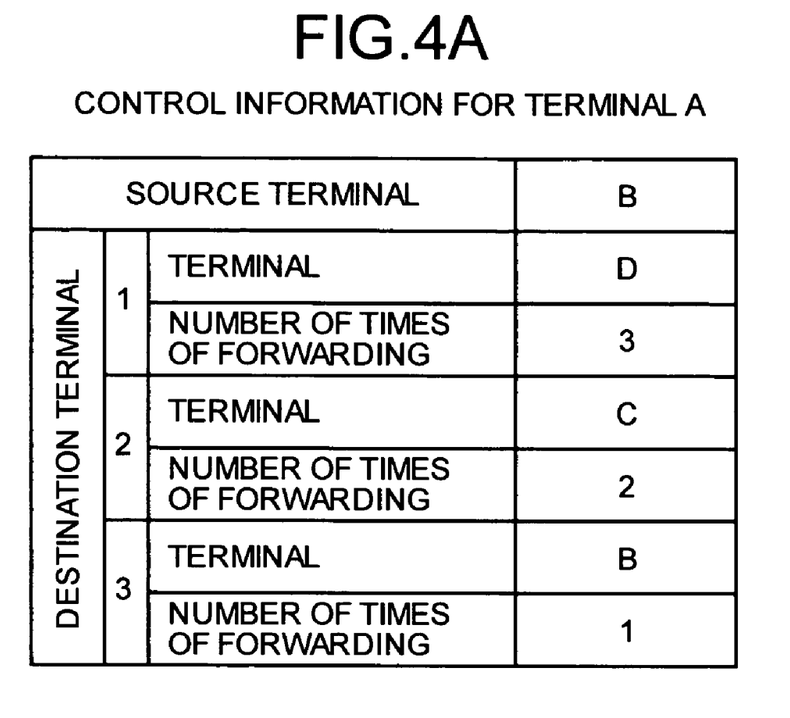
FIG. 4A is a diagram of data structure of control information.
Figure 4B:
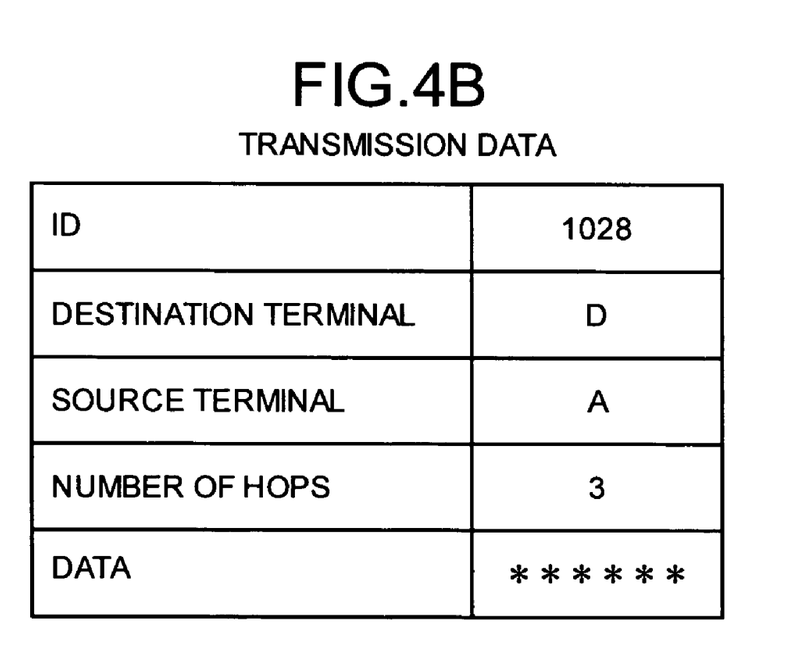
FIG. 4B is a diagram of data structure of transmission data.

FIG. 2 is a diagram of setting used to explain each data structure of the routing table 25, control information, and transmission data. FIGS. 3A to 3E are diagrams of the data structures of routing tables each as the routing table 25 (FIG. 1) for terminals A to E. FIG. 4A is a diagram of the data structure of the control information for terminal A, and FIG. 4B is a diagram of the data structure of transmission data.

As shown in FIG. 2, each of the communication terminals (terminal A to terminal E) has a wireless communication function, and forms an ad hock network. The terminal A and the terminal B are within a range where a radio wave reaches, and therefore, direct transmission/reception of data can be performed wirelessly between the two terminals. Likewise, the terminal B and the terminal C, the terminal C and the terminal D, and the terminal C and the terminal E are within each range where direct transmission/reception of data can be performed between the two terminals.

The terminal A and the terminal C are outside the range where the radio wave does not reach, and therefore, the direct transmission/reception of data cannot be performed between the two terminals. However, the terminal B relays the data to allow data transmission or data reception to be performed between the terminal A and the terminal C. When the data transmission or the data reception is to be performed therebetween, the routing table 25 is referred to in order to decide a data transmission route.

As shown in each of FIGS. 3A to 3E, identifying information, another identifying information, and routing information are entered in the routing table 25. The identifying information identifies a destination terminal, and the another identifying information identifies an initial forward destination terminal to which each communication terminal initially transmits data when the data is to be transmitted to a destination terminal. The routing information includes the "number of times of forwarding" that indicates how many communication terminals are used to forward data during the process of transmitting the data to a destination terminal. The format to hold the routing information is not limited to ones as shown in FIGS. 3A to 3E, but the routing information may be held in any format.

In FIGS. 3A to 3E, the terminal names (A to E) related to the destination terminal are used as the identifying information for identifying a destination terminal, and the terminal names (A to E) related to the initial forward destination terminal are used as the identifying information for identifying an initial forward destination terminal. The identifying information is not limited by the terminal name if any information can be used to identify a communication terminal.

Referring to the routing table 25 for the terminal A, for example, if the destination terminal is the terminal A, the terminal A is its own (local) terminal. Therefore, the column of the initial forward destination terminal is blank, and the number of times of forwarding is set to zero. If the destination terminal is the terminal B, the initial forward destination terminal is the terminal B, which is the destination terminal. Therefore, the number of times of forwarding is set to 1.

Furthermore, if the destination terminal is the terminal C, the initial forward destination terminal is the terminal B, and the number of times of forwarding is set to 2. Likewise, if the terminal D and the terminal E are destination terminals, their initial forward destination terminals are the terminal B, and the number of times of forwarding is set to 3. The same goes for the cases of the routing tables 25 for the other communication terminals B to E.

If data is transmitted from the terminal A to the terminal D, the destination terminal is the terminal D. The terminal A that transmits the data searches for a row in which the terminal D is entered as the destination terminal, across the routing table 25 of its own terminal, to find out which terminal is the initial forward destination terminal. As a result of searching, it is found that the terminal B is entered in the row as the initial forward destination terminal, and therefore, the terminal A transmits the data to the terminal B.

In the same manner as that of the terminal A, the terminal B having received the data searches for a row in which the terminal D is entered as the destination terminal, across the routing table 25 of its own terminal. As a result of searching, it is found that the terminal C is entered in the row as the initial forward destination terminal, and therefore, the terminal B transmits the data to the terminal C.

The terminal C having received the data searches for a row in which the terminal D is entered as the destination terminal, across the routing table 25 of its own terminal. As a result of searching, it is found that the terminal D is entered in the row as the initial forward destination terminal, and that the terminal D is the destination terminal. Therefore, the terminal C transmits the data to the terminal D, and the transmission of the data from the terminal A to the terminal D is complete. Thereafter, the terminal D sends an acknowledgement message back to the terminal as a transmission source.

Each of the communication terminals can transmit data to a desired communication terminal in the above manner. The routing table 25 includes information not for all the communication terminals through which the data passes but only information for the initial forward destination terminal and the number of times of forwarding for each destination terminal. Therefore, it is advantageous that not too much capacity of the storage device is occupied.

The routing table 25 shown here is not fixed, but periodically updated. For example, if the power of the terminal C is shut off or if the terminal C deviates from the range where the radio wave reaches and communications are possible, it is impossible to transmit the data through the terminal C.

According to the present embodiment, each communication terminal transmits the control information used to update the routing table 25 at fixed time intervals, and the state of the routing table 25 is kept new. This can support changes in states of communication terminals.

As shown in FIG. 4A, the control information includes source-terminal identifying information for identifying a source terminal that can serve as an initial forward destination of a communication terminal that transmits data upon data transmission: The control information also includes terminal identifying information for identifying a communication terminal that can serve as a destination terminal upon data transmission, and information for the number of times of forwarding that indicates how many communication terminals are used to forward the control information to the destination terminal. These pieces of identifying information use the terminal name of the communication terminal, but the identifying information is not limited by the terminal name if any information can identify each of the communication terminals.

FIG. 4A indicates an example of the control information received by the terminal A. The control information is initially transmitted by the terminal D, and then forwarded by the terminal C and the terminal B. Accordingly, the terminal B is the source terminal for the terminal A. If the destination terminal is the terminal D, the number of times of forwarding the control information transmitted from the terminal B in this case is 3, and therefore, it is obvious that the source terminal is the terminal B.

The terminal A searches for a terminal name of a destination terminal across the routing table 25 for its own terminal, based on the terminal name of the destination terminal included in the control information, and obtains a corresponding number of times of forwarding. The number of times of forwarding included in the control information is compared with that in the routing table 25. If the number of times of forwarding included in the control information is less than that in the routing table 25, the terminal name of the initial forward destination terminal in the routing table 25 is changed to the terminal name of the source terminal in the control information.

This change allows an efficient data transmission route to be stored in the routing table 25. The efficient data transmission route requires a less number of times of forwarding when the data is to be transmitted to the destination terminal.

FIG. 4B indicates a data structure of data to be transmitted along the data transmission route built in the above manner. As shown in the figure, the transmission data includes an ID of data, identifying information for identifying a destination terminal, another identifying information for-identifying a source terminal of data, the number of hops, and the data for transmission. The identifying information is a terminal name of a communication terminal in this example, but the identifying information is not limited to the terminal name if a communication terminal can be identified with the identifying information.

The ID of data is identifying information. If the same data is transmitted to the same terminal a plurality of times, the ID is used to detect the above fact and abandon the data. The number of 1028 is set here as the ID. However, any information can be used as ID if data can be identified with it.

The number of hops is incremented by one each time the data is forwarded by each communication terminal. If the number of hops exceeds the maximum number of hops that is preset, the relevant data is abandoned.

The example of FIG. 4B indicates a data structure of transmission data when the data is transmitted from the terminal A that is a source terminal to the terminal D that is a destination terminal and the data is received by the terminal D. During transmission of the data from the terminal A to the terminal D, the number of hops increases to 3.

Figure 5:
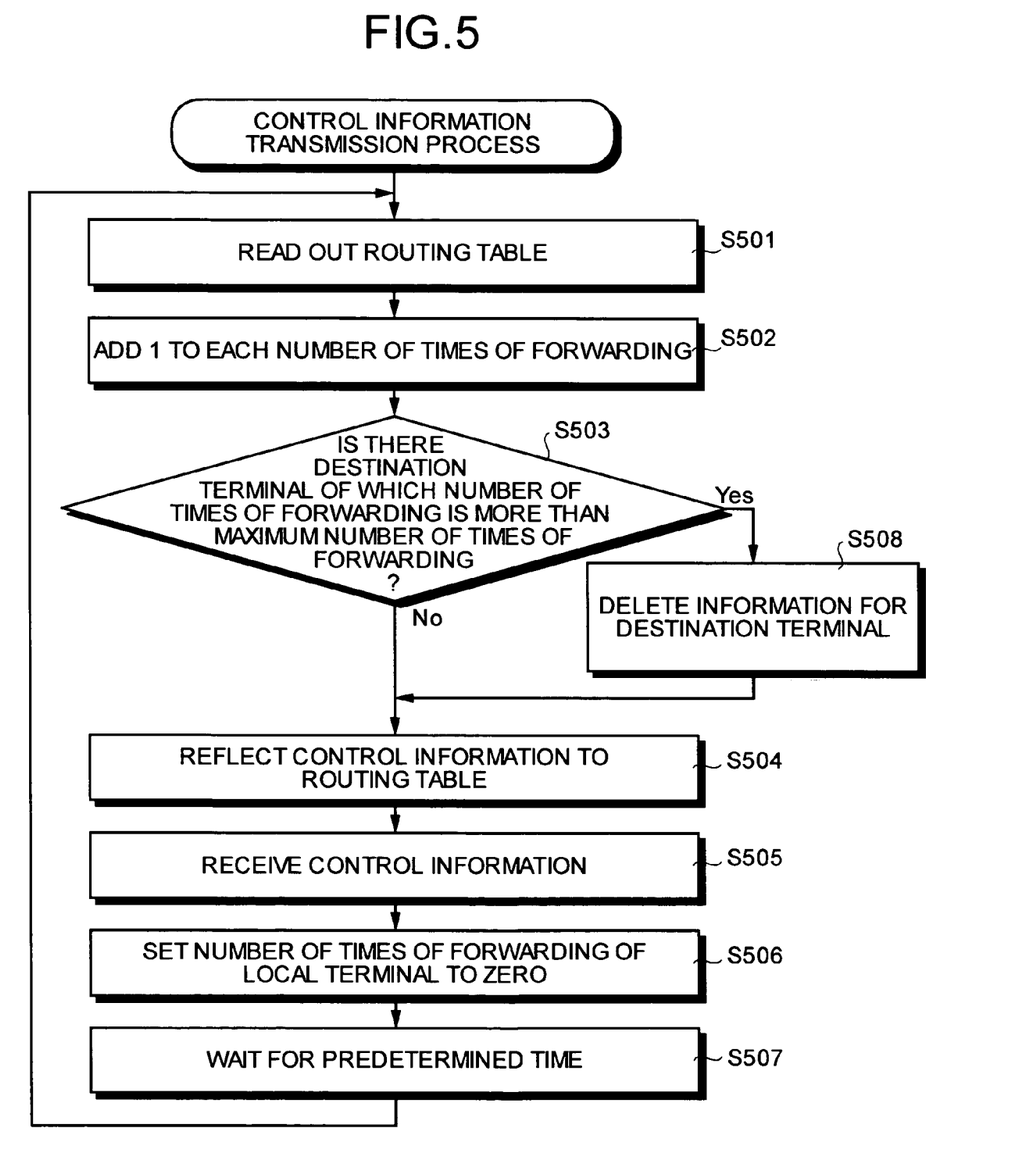
FIG. 5 is a flowchart of a process procedure for transmitting control information to neighboring communication terminals of the communication terminal.

FIG. 5 is a flowchart of the process procedure for transmitting control information to the neighboring communication terminals of the communication terminal.

A communication terminal that transmits control information reads out information for a destination terminal name and the number of times of forwarding from the routing table 25 (step S501), and adds 1 to the number of times of forwarding read-out (step S502). The destination terminal name and the number of times of forwarding to be read out here include its own terminal name and the number of times of forwarding.

It is checked whether there is any information for a destination terminal of which the number of times of forwarding exceeds the maximum number of times of forwarding preset as a result of addition (step S503). If it is less than the maximum number of times of forwarding (step S503, No), the information as follows is reflected to the routing table 25 (step S504). The information includes the destination terminal name read-out, the number of times of forwarding with 1 added thereto, and its own terminal name set in the source terminal name. The information as control information is transmitted to the neighboring communication terminals (step S505). The control information to be transmitted includes such control information that data is initially transmitted from the own terminal and a destination terminal name is the own terminal name.

If there is a destination terminal of which the number of times of forwarding becomes more than the maximum number of times of forwarding (step S503, Yes), information for a corresponding destination terminal, i.e., information for a destination terminal name, an initial forward destination terminal name, and the number of times of forwarding is deleted from the routing table 25, and is also deleted from control information to be transmitted (step S508). Based on this therefore, if a communication terminal deviates from a range where radio communication is possible, or if the power is disconnected, the information for the relevant communication terminal is deleted.

Then, the process proceeds to step S504, where the information for the destination terminal is reflected to the routing table. The information includes the number of times of forwarding that is less than the maximum number of times of forwarding, that is, the information includes the destination terminal name, the number of times of forwarding with 1 added thereto, and its own terminal name set in the source terminal name. The information as control information is also transmitted to all the adjacent terminals. After the control information is transmitted, the number of times of forwarding of the own terminal is set to "0" (step S506), and the process is in a standby state for a predetermined time until the next process of transmitting control information is started (step S507).

Figure 6:
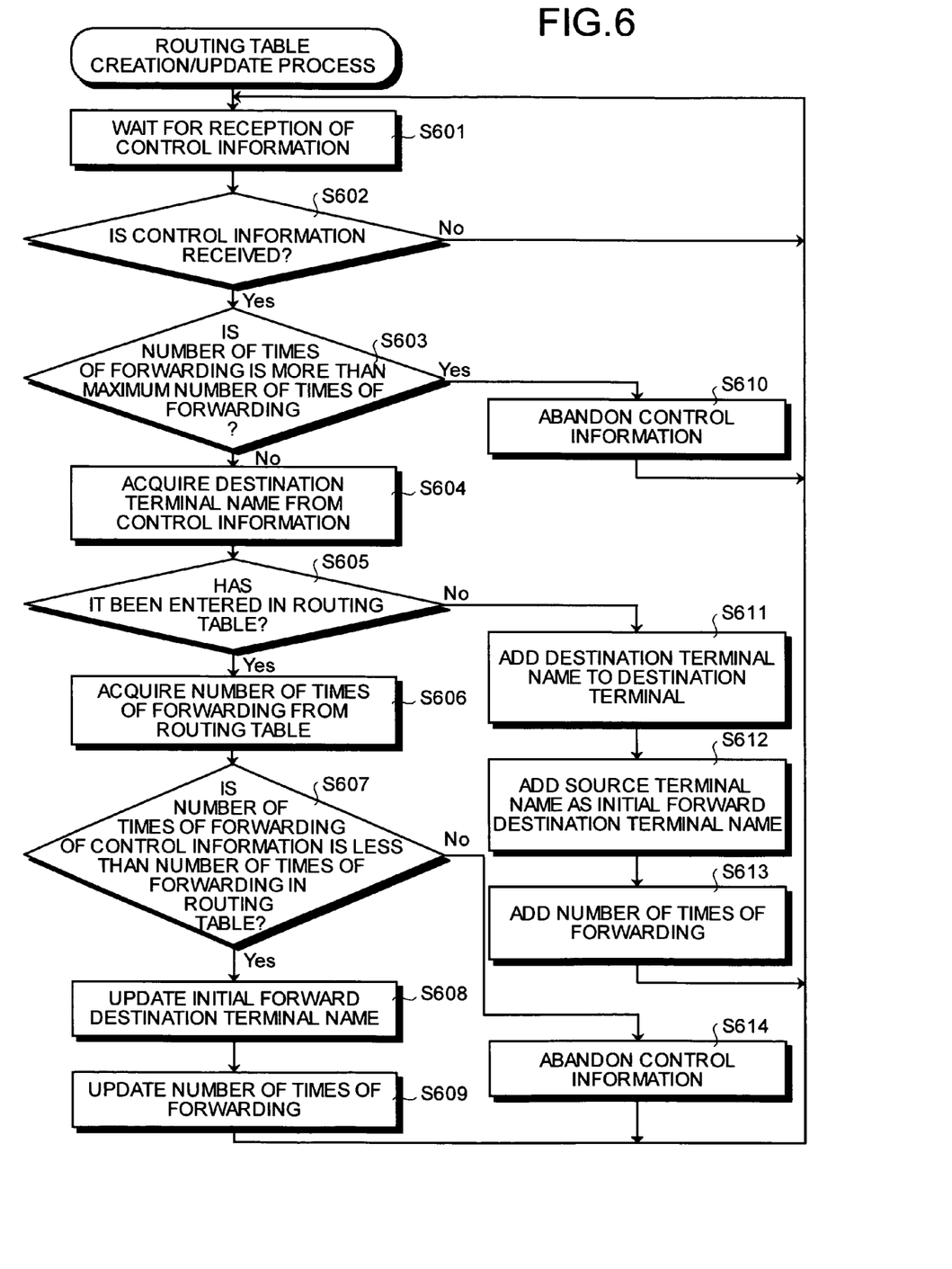
FIG. 6 is a flowchart of a process procedure for creating or updating the routing table based on the control information.

FIG. 6 is a flowchart of the process procedure for creating or updating the routing table 25 based on the control information.

As shown in the figure, it is waited to receive control information transmitted from another communication terminal (step S601), and it is checked whether the control information is received (step S602). If it is not received (step S602, No), then the process returns to step S601, where it is waited to receive the control information.

If the control information is received (step S602, Yes), it is checked whether the number of times of forwarding included in the control information is more than the maximum number of times of forwarding preset (step S603). If it is more than the maximum number of times of forwarding (step S603, Yes), then the control information received is abandoned (step S610), and the process proceeds to step S601.

If the number of times of forwarding included in the control information is less than the maximum number of times of forwarding (step S603, No), a destination terminal name, which is identifying information for a communication terminal to which the control information is initially transmitted, is acquired from the control information received (step S604). It is checked whether the destination terminal name has been entered, as a destination terminal, in the routing table 25 (step S605). If it has been entered (step S605, Yes), information for the number of times of forwarding corresponding to the destination terminal name is obtained from the routing table 25 (step S606).

It is checked whether the number of times of forwarding included in the control information is less than the number of times of forwarding obtained from the routing table 25 (step S607). If it is not less than the number of times of forwarding (step S607, No), the control information is abandoned (step S614), and the process proceeds to step S601.

If it is less than the number of times of forwarding obtained from the routing table 25 (step S607, Yes), the initial forward destination terminal name of the routing table 25 is updated by the source terminal name included in the control information (step S608). Thereafter, the number of times of forwarding in the routing table 25 corresponding to the initial forward destination terminal name is updated by the number of times of forwarding included in the control information (step S609).

At step S605, if the destination terminal name included in the control information has not been entered, as a destination terminal name, in the routing table 25 (step S605, No), the destination terminal name is newly added to the routing table 25 (step S611).

The source terminal name included in the control information is added, as the initial forward destination terminal name, to the routing table 25 (step S612), and the number of times of forwarding included in the control information is added to the routing table 25 (step S613). After addition, the process proceeds to step S601, where the arrival of control information is waited again.

Figure 7:
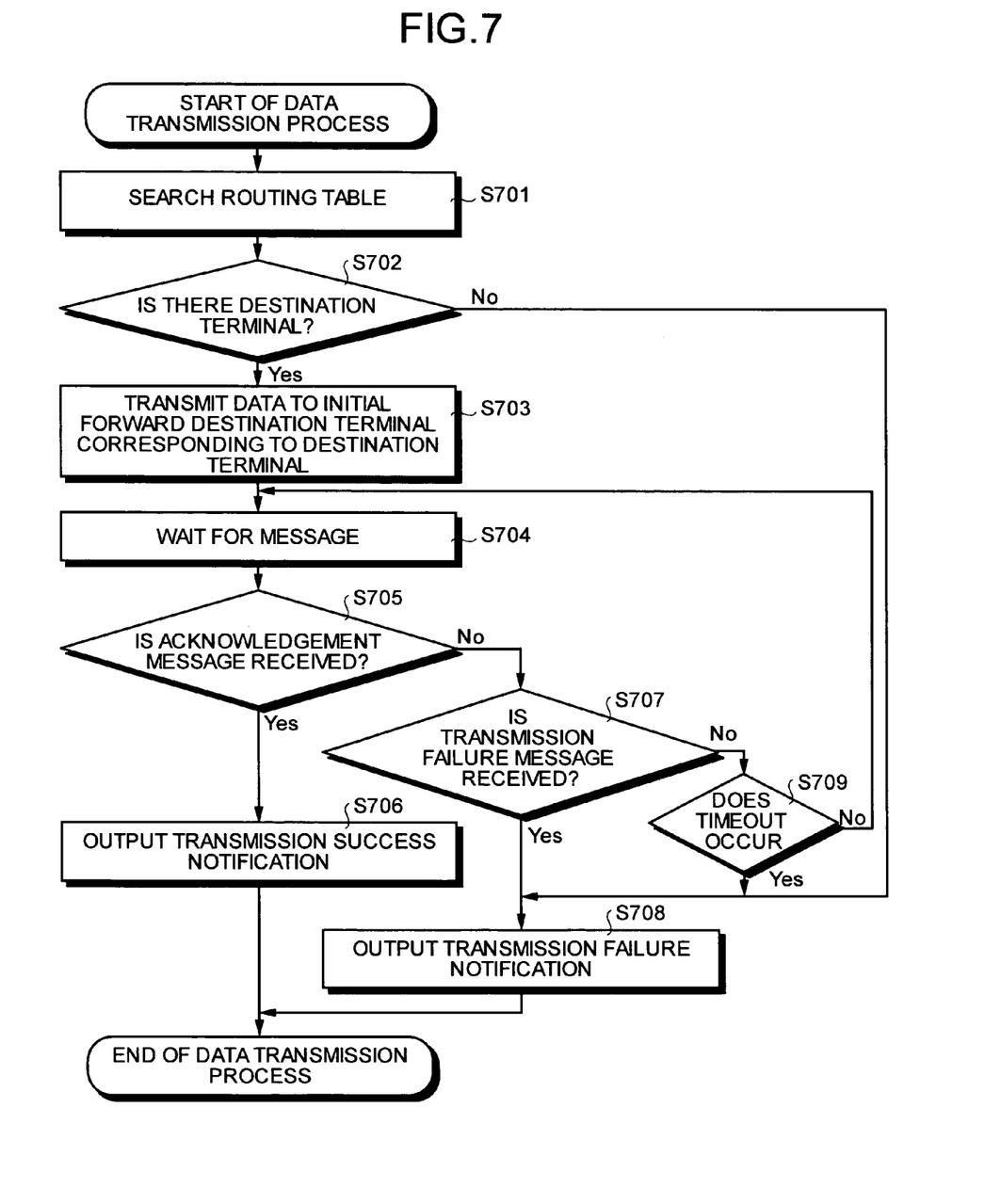
FIG. 7 is a flowchart of a process procedure for transmitting data to a destination communication terminal.

FIG. 7 is a flowchart of the process procedure for transmitting data to a destination terminal.

As shown in the figure, after a destination terminal to which data is to be transmitted is specified, the routing table 25 is searched (step S701) to check whether a corresponding destination terminal is entered in the routing table 25 (step S702). If the destination terminal is not entered therein (step S702, No), a data transmission failure notification is output to application software or the like that has transmitted data (step S708), and the data transmission process is ended.

If the destination terminal is entered (step S702, Yes), the data is transmitted to the initial forward destination terminal corresponding to the destination terminal to which the data is to be transmitted (step S703). Thereafter, it is waited for a message from a communication terminal to which the data is forwarded or from the destination terminal (step S704), and it is checked whether an acknowledgement message is received (step S705). If the acknowledgement message is received (step S705, Yes), a transmission success notification is output to application software or the like that has transmitted data (step S706).

If the acknowledgement message is not received (step S705, No), it is checked whether a transmission failure message is received (step S707). If the transmission failure message is received (step S707, Yes), the process proceeds to step S708, where the data transmission failure notification is output to application software or the like that has transmitted data, and the data transmission process is ended.

If the transmission failure message is not received (step S707, No), it is checked whether a timeout for a message reception standby state occurs (step S709). If the timeout occurs (step S709, Yes), the process proceeds to step S708, where the data transmission failure notification is output to application software or the like that has transmitted data, and the data transmission process is ended. If the timeout does not occur (step S709, No), the process proceeds to step S704, where it is continued to wait for the message.

Figure 8:
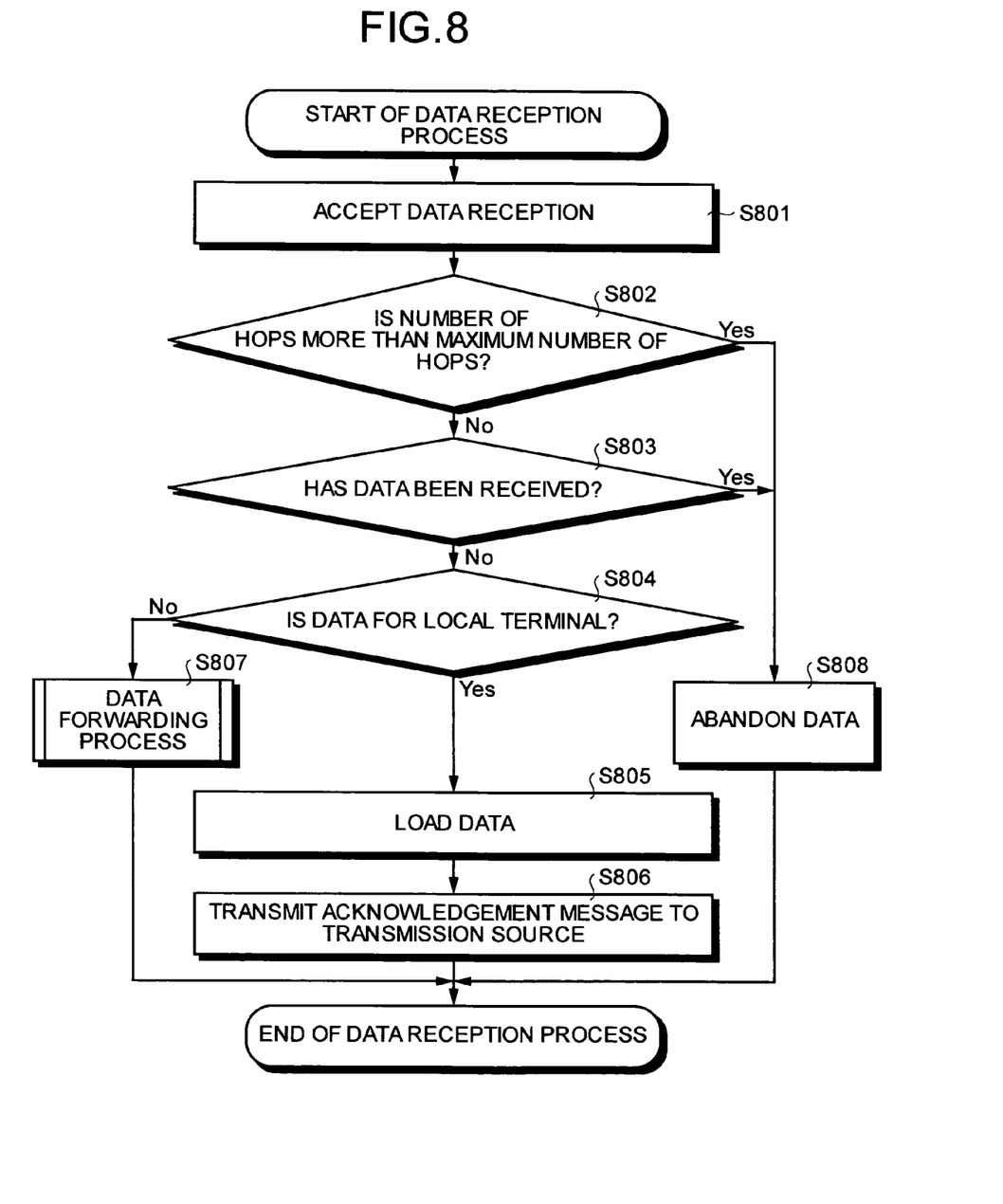
FIG. 8 is a flowchart of a process procedure for receiving data from another communication terminal.

FIG. 8 is a flowchart of the process procedure for receiving data from another communication terminal. As shown in the figure, at first, data transmitted is accepted (step S801), and it is checked whether the number of hops included in the data accepted is more than the maximum number of hops (step S802). If it is more than the maximum number of hops (step S802, Yes), the data accepted is abandoned (step S808), and a data reception process is ended as it is.

If it is less than the maximum number of hops (step S802, No), then it is checked whether the data has already been received based on the ID of the data (step S803). If it has already been received (step S803, Yes), the process proceeds to step S808, where the data is abandoned, and the data reception process is ended as it is.

If it has not been received yet (step S803, No), then it is checked whether the destination of the data is the own terminal (step S804). If the destination of the data is the own terminal (step S804, Yes), then the data received is loaded in (step S805), the acknowledgement message is transmitted to a communication terminal. as the transmission source (step S806), and the reception process is ended.

If the destination of the data is not the own terminal (step S804, No), then data forwarding process is performed (step S807), and the data reception process is ended. The data forwarding process is explained later with reference to FIG. 9.

Figure 9:
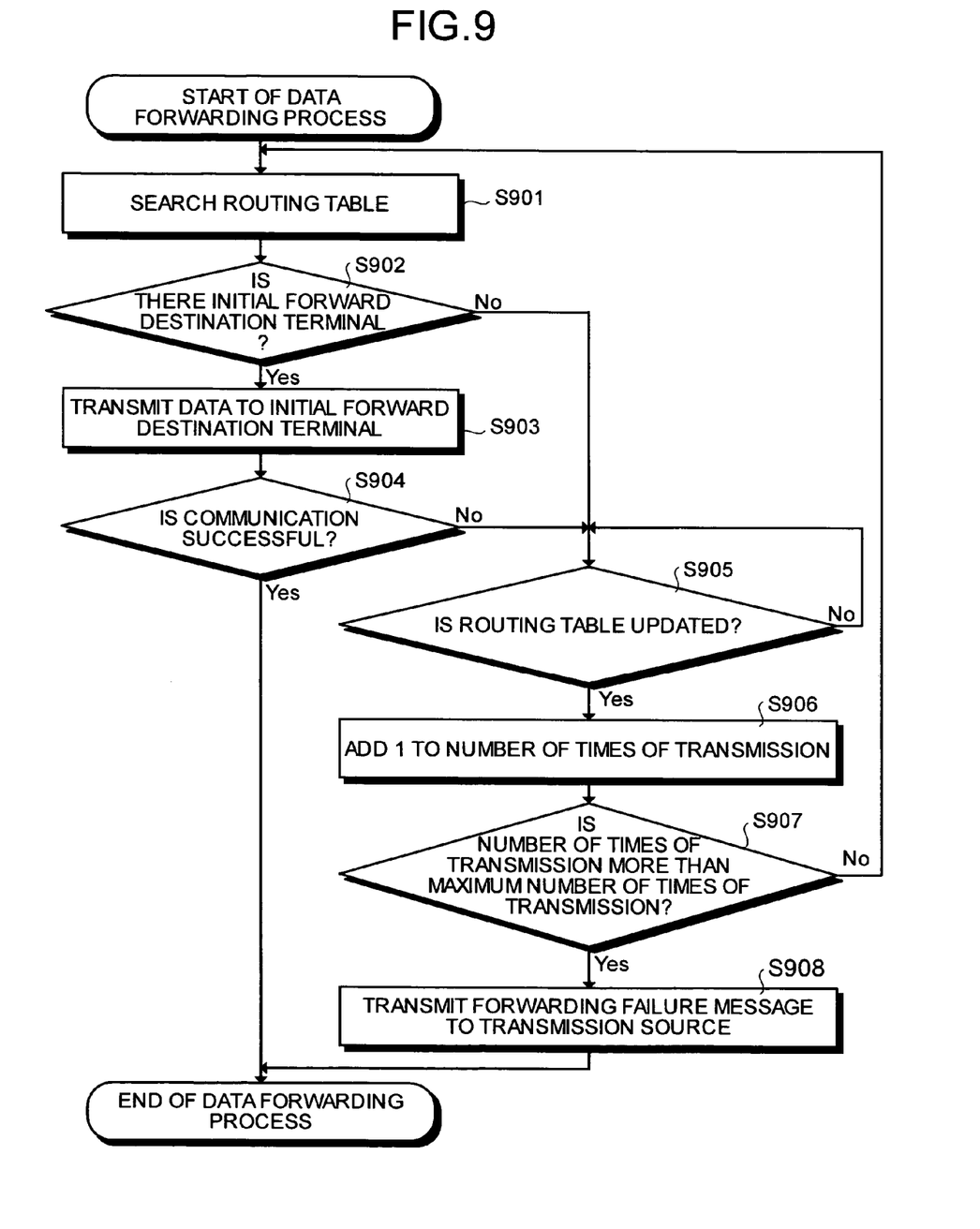
FIG. 9 is a flowchart of a process procedure for forwarding data received to the next communication terminal.

FIG. 9 is a flowchart of the process procedure for forwarding data received to another communication terminal. As shown in the figure, at first, the data is received, and then the routing table 25 is searched (step S901) to check whether an initial forward destination terminal corresponding to the destination terminal of the data is entered in the routing table 25 (step S902).

If the initial forward destination terminal corresponding to the destination terminal of the data is not entered (step S902, No), the process proceeds to step S905, where the routing table 25 is waited to be updated (step S905, No). And it is checked again whether the initial forward destination terminal corresponding to the destination terminal of data is entered in the routing table 25.

If the routing table 25 is updated (step S905, Yes), then 1 is added to the number of times of transmission of data (step S906). It is checked whether the number of times of transmission as a result of addition becomes more than the maximum number of times of transmission preset (step S907).

If the number of times of transmission is not more than the maximum number of times of transmission (step S907, No), the process proceeds to step S901, where the routing table 25 is again searched. If it is more than the maximum number of times of transmission (step S907, Yes), a forwarding failure message is transmitted to the transmission source (step S908), and the data forwarding process is ended.

At step S902, if an initial forward destination terminal corresponding to the destination terminal of data is entered in the routing table 25 (step S902, Yes), the data is transmitted to the initial forward destination terminal (step S903), and it is checked whether the communication is successful (step S904).

If the communication is successful (step S904, Yes), the data forwarding process is ended. If the communication is unsuccessful (step S904, No), it is waited to update the routing table 25 in the same manner as that of the case where the initial forward destination terminal corresponding to the destination terminal is not entered at step S902 (step S905, No).

If the routing table 25 is updated (step S905, Yes), then 1 is added to the number of times of transmission (step S906). It is checked whether the number of times of transmission as a result of addition becomes more than the maximum number of times of transmission (step S907).

If the number of times of transmission is not more than the maximum number of times of transmission (step S907, No), the process proceeds to step S901, where the routing table 25 is again searched. If it is more than the maximum number of times of transmission (step S907, Yes), a forwarding failure message is transmitted to the transmission source (step S908), and the data forwarding process is ended.

Figure 10A:
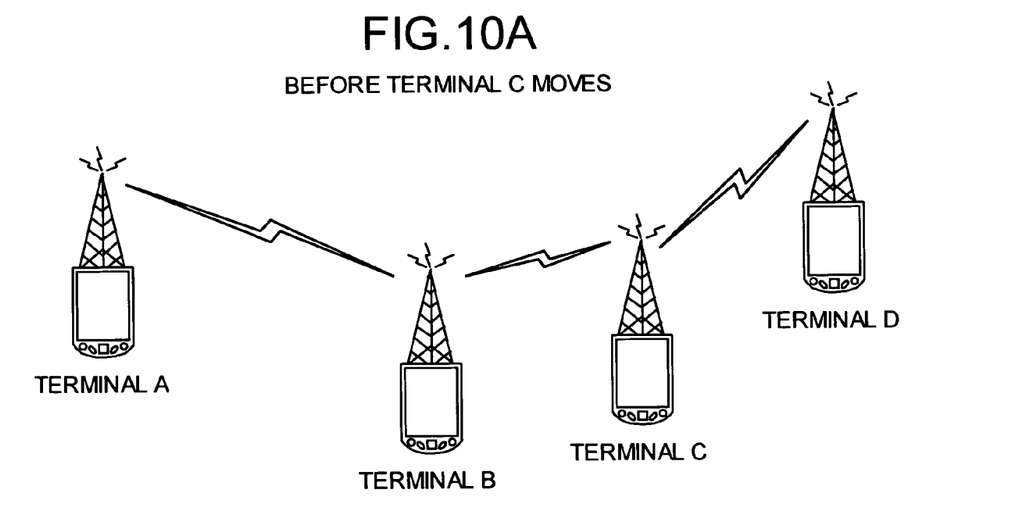
FIG. 10A is a diagram of an example of communication terminals that form a data transmission route.
Figure 10B:
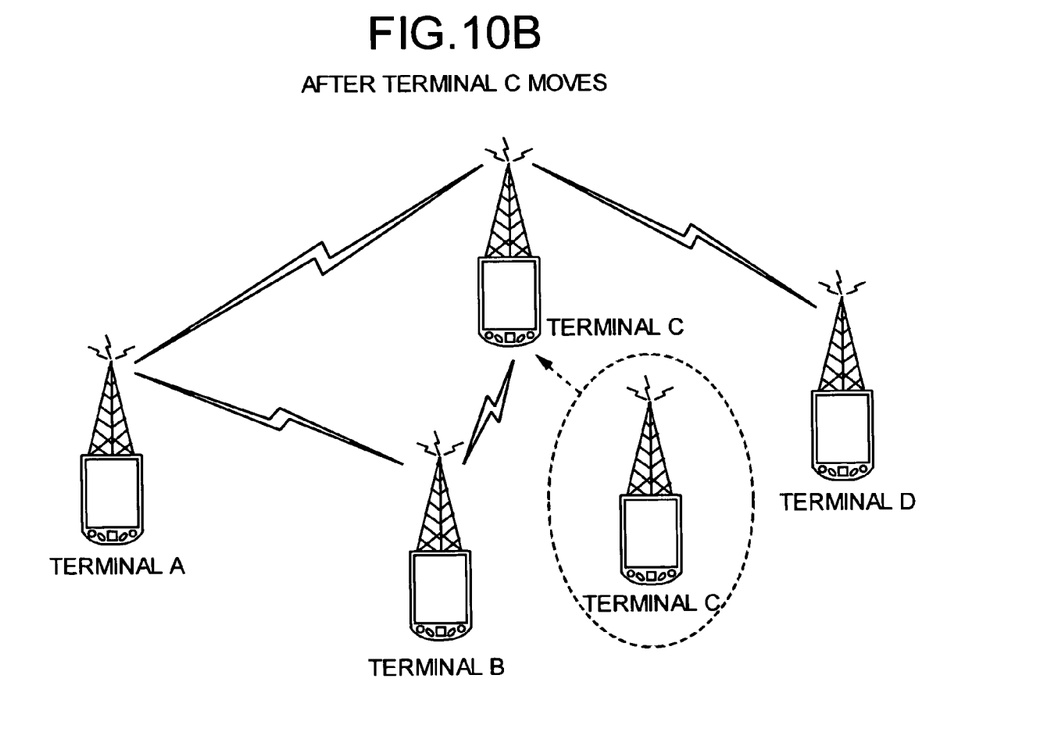
FIG. 10B is a diagram of an example when one of the communication terminals deviates from the data transmission route.

FIG. 10A is a diagram of an example of communication terminals that form a data transmission route, and FIG. 10B is a diagram of an example when one of the communication terminals deviates from the data transmission route. As shown in FIG. 10A, the terminal A and the terminal B are within a range where a radio wave reaches, and therefore, direct data transmission/reception can be performed between the two terminals. Likewise, the terminal B and the terminal C, and the terminal C and the terminal D are in each range where data transmission/reception can be performed between the two terminals. Here, the terminal C moves to a location as shown in FIG. 10B to allow data transmission/reception to be directly performed between the terminal A and the terminal D.

If data is to be transmitted from the terminal A to the terminal D, a first data transmission route of the terminal A, the terminal B, the terminal C, and the terminal D is compared with a second data transmission route of the terminal A, the terminal C, and the terminal D. As a result of comparison, it is found that data can be transmitted more effectively through the second data transmission route with the less number of times of forwarding.

If such a transmission route is built, the communication terminals explained according to the present embodiment can flexibly support the change using the control information periodically transmitted by the communication terminals.

Figure 11:
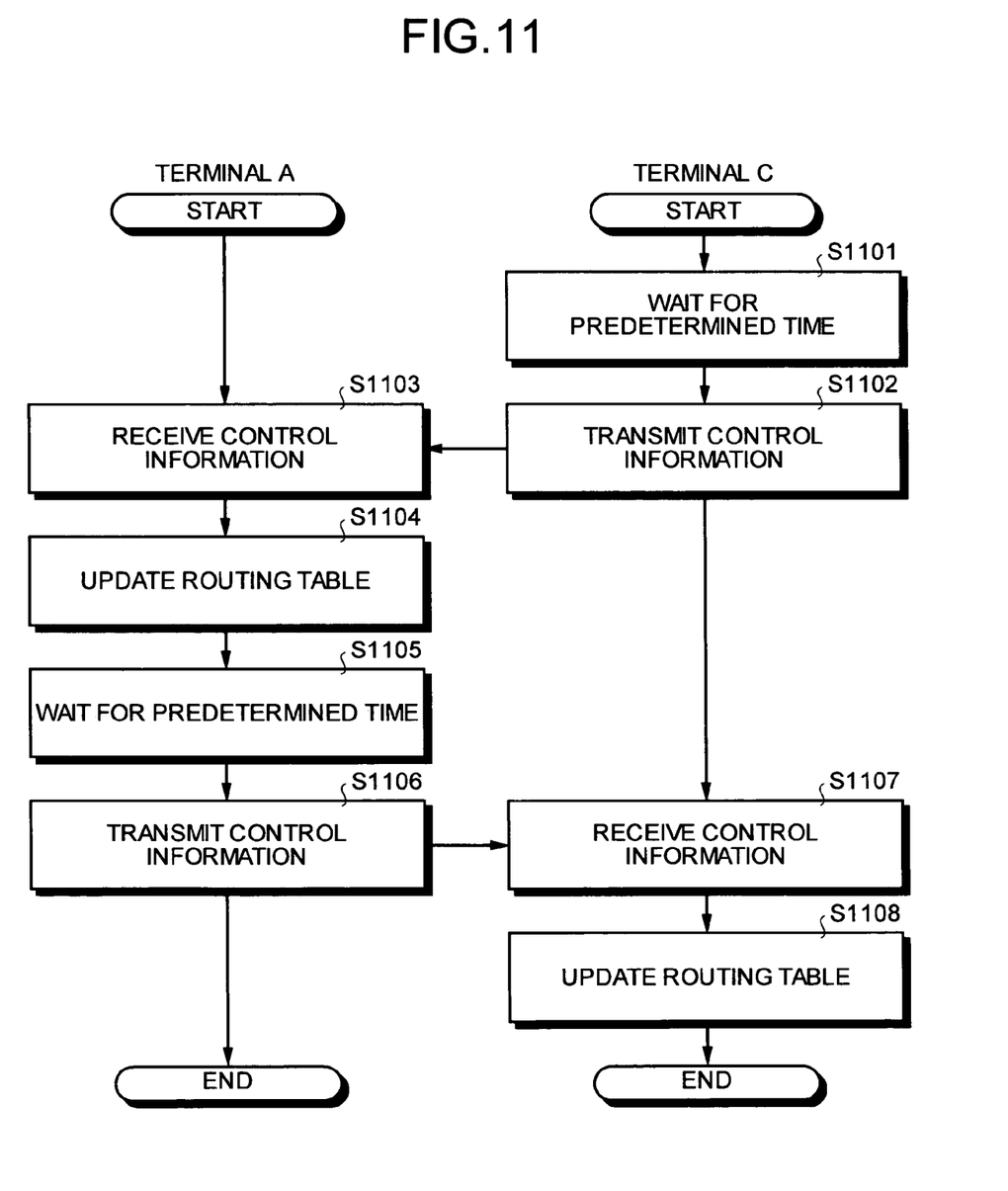
FIG. 11 is a flowchart of a process procedure for building a new data transmission route when one of the communication terminals deviates from the data transmission route.

FIG. 11 is a flowchart of the process procedure for building a new data transmission route when one of the communication terminals deviates from the data transmission route. As shown in FIG. 11, if the terminal C moves to the location as shown in FIG. 10B, because the terminal C is to periodically transmit control information, the terminal C transmits the control information to the neighboring communication terminals (step S1102) after waiting for a predetermined time (step S1101). Since the terminal A is within a range where it can communicate with the terminal C, the terminal A receives the control information transmitted from the terminal C (step S1103).

The terminal A updates the routing table 25 for its own terminal based on the control information received (step S1104). The process of updating is the same as that of FIG. 6. After the process, because the terminal A is also to periodically transmit control information, the terminal A transmits the control information to the neighboring communication terminals (step S1106) based on the routing table 25 updated after waiting for a predetermined time (step S1105). The terminal C receives the control information (step S1107), and updates the routing table 25 for its own terminal (step S1108).

Figure 12A:
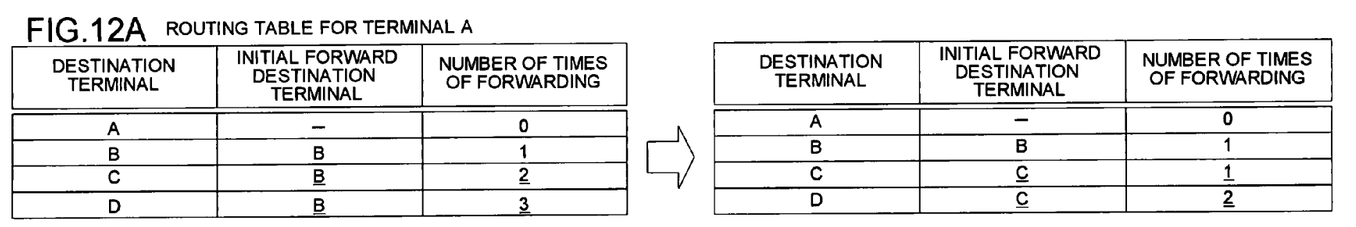
FIGS. 12A to 12D are diagrams of changes in routing tables when a data transmission route is built.
Figure 12B:
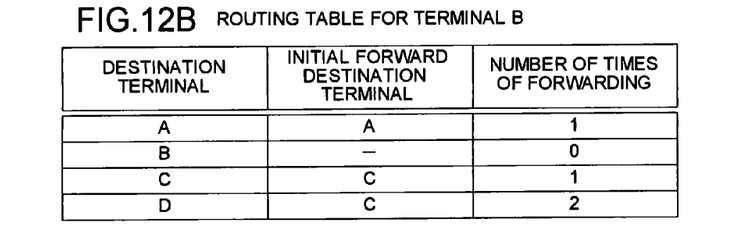
Figure 12C:
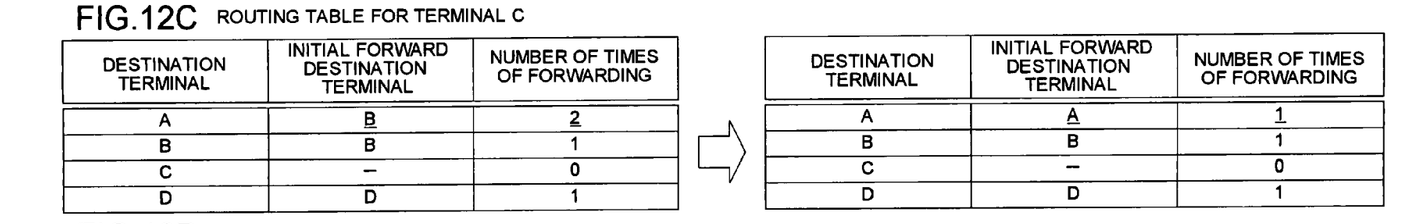
Figure 12D:
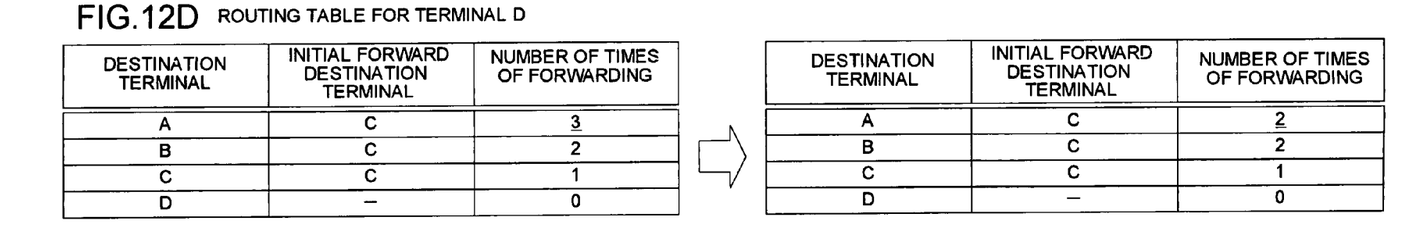

FIGS. 12A to 12D are diagrams of how each of the routing tables 25 is changed when a data transmission route is built. The routing table 25 for the terminal B as shown in FIG. 12B and FIG. 12D is not changed.

As a result of updating the routing table 25 for the terminal A, if the destination terminals are the terminal C and the terminal D, the initial forward destination terminals for them are changed to the terminal C. Thus, each number of times of forwarding is reduced. As a result of updating the routing table 25 for the terminal C, if the destination terminal is the terminal A, the initial forward destination terminal is changed to the terminal A. Thus, the number of times of forwarding is reduced.

As a result of updating the routing table 25 for the terminal D, if the destination terminal is the terminal A, the number of times of forwarding is reduced. A data transmission route with the less number of times of forwarding is efficiently found out in the above manner, and the data transmission route found out can be reflected to data transmission.

As explained above, according to the present embodiment, the communication terminals periodically transmit the control information, which allows information for the routing table 25 obtained in each of the communication terminals to be kept new. Therefore, even if a communication terminal moves or a communication terminal is newly connected to the network, a data transmission route can be efficiently ensured. Furthermore, by including information for the number of times of forwarding in the control information, a route with the less number of times of forwarding of data can be found out, which makes it possible to optimize a data transmission route.

The case where the present invention is applied to the ad hoc network that is a kind of wireless network is explained in the above embodiment; however, the present invention is not limited to the above embodiment, and can also be applied to other type of wireless network.

As explained above, according to the present invention, the communication terminal transmits or receives control information indicating the number of times of forwarding required for performing communication with one of other communication terminals included in the wireless network. Based on the control information received, the communication terminal creates routing information for each of the communication terminals. The routing information indicates a communication terminal as an initial forward destination to which data is initially transmitted if the one communication terminal is a destination. The communication terminal transmits data based on the routing information created. The control information includes the source-terminal identifying information indicating a communication terminal that transmits the control information to a local communication terminal, the terminal identifying information indicating a communication terminal that is a destination of data transmission, and the number of times of forwarding required for transmitting the control information from the communication terminal as a destination to the local communication terminal. The communication terminal transmits control information in which a destination of data transmission is set to its own (local) communication terminal, at predetermined time intervals, after 1 is added to the number of times of forwarding included in the control information. The communication terminal also rewrites the identifying information for the local communication terminal with the source-terminal identifying information for control information received from another communication terminal, adds 1 to the number of times of forwarding, and forwards the control information. Therefore, even if a communication terminal that forms the wireless network moves or a communication terminal is newly connected to the wireless network, it is possible to efficiently optimize a data transmission route.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication terminal that builds a wireless network, the communication terminal comprising:
    a control-information transceiver that transmits and receives control information indicating number of times of forwarding required for a communication with the communication terminal, with respect to other communication terminals connected to the wireless network;
    a routing-information creating unit that creates, based on the control information received, routing information indicating an initial forward-destination terminal to which data is firstly transmitted when the communication terminal is a destination, for each of the other communication terminals; and
    a data transmitting unit that transmits the data based on the routing information, wherein
    the control information includes source-terminal identifying information indicating a communication terminal that transmitted the control information, terminal identifying information indicating a data-transmission destination terminal that is a destination of data transmission, and the number of times of forwarding required for transmitting the control information from the data-transmission destination terminal to the communication terminal, and
    the control information transceiver transmits the control information in which the destination of data transmission is set to the communication terminal at a predetermined time interval, rewrites the identifying information for the communication terminal with source-terminal identifying information in the control information received from other communication terminal, and forwards the control information after adding one to the number of times of forwarding.

2. The communication terminal according to claim 1, wherein the terminal identifying information, initial-forward-destination-terminal identifying information indicating the initial forward-destination terminal, and information on the number of times of forwarding required for a communication with the data-transmission-destination terminal are registered in the routing information.

3. The communication terminal according to claim 2, wherein when the terminal identifying information included in the control information received is not registered in the routing information, the routing-information creating unit registers the terminal identifying information, the source-terminal identifying information, and the number of times of forwarding included in the control information, in the routing information as the terminal identifying information, the initial-forward-destination-terminal identifying information, and the number of times of forwarding of the routing information, respectively.

4. The communication terminal according to claim 3, wherein when the terminal identifying information included in the control information received is registered in the routing information, the routing-information creating unit compares the number of times of forwarding included in the control information with the number of times of forwarding, which is registered in the routing information, corresponding to the terminal identifying information, and when the number of times of forwarding included in the control information is smaller than the number of times of forwarding registered in the routing information, updates the initial-forward-destination-terminal identifying information and the number of times of forwarding registered in the routing information with the source-terminal identifying information and the number of times of forwarding included in the control information.

5. The communication terminal according to claim 4, wherein the control information transceiver acquires the terminal identifying information, the initial-forward-destination-terminal identifying information, and the information for the number of times of forwarding registered in the routing information, and transmits the control information after adding one to the number of times of forwarding acquired.

6. The communication terminal according to claim 5, wherein when a value obtained by adding one to the number of times of forwarding included in the control information exceeds a predetermined value, the control information transceiver discards the control information.

7. A communication method with which a communication terminal that builds a wireless network performs a communication, the communication method comprising:
   transmitting and receiving control information indicating number of times of forwarding required for a communication with the communication terminal, with respect to other communication terminals connected to the wireless network;
   creating, based on the control information received, routing information indicating an initial forward-destination terminal to which data is firstly transmitted when the communication terminal is a destination, for each of the other communication terminals; and
   transmitting the data based on the routing information, wherein
   the control information includes source-terminal identifying information indicating a communication terminal that transmitted the control information, terminal identifying information indicating a data-transmission destination terminal that is a destination of data transmission, and the number of times of forwarding required for transmitting the control information from the data-transmission destination terminal to the communication terminal, and
   the transmitting and receiving includes
      transmitting the control information in which the destination of data transmission is set to the communication terminal at a predetermined time interval;
      rewriting the identifying information for the communication terminal with source-terminal identifying information in the control information received from other communication terminal; and
      forwarding the control information after adding one to the number of times of forwarding.

8. The communication method according to claim 7, wherein the terminal identifying information, initial-forward-destination-terminal identifying information indicating the initial forward-destination terminal, and information on the number of times of forwarding required for a communication with the data-transmission-destination terminal are registered in the routing information.

9. The communication method according to claim 8, wherein when the terminal identifying information included in the control information received is not registered in the routing information, the creating includes registering the terminal identifying information, the source-terminal identifying information, and the number of times of forwarding included in the control information, in the routing information as the terminal identifying information, the initial-forward-destination-terminal identifying information, and the number of times of forwarding of the routing information, respectively.

10. The communication method according to claim 9, wherein when the terminal identifying information included in the control information received is registered in the routing information, the creating includes
   comparing the number of times of forwarding included in the control information with the number of times of forwarding, which is registered in the routing information, corresponding to the terminal identifying information; and
   updating, when the number of times of forwarding included in the control information is smaller than the number of times of forwarding registered in the routing information, the initial-forward-destination-terminal identifying information and the number of times of forwarding registered in the routing information with the source-terminal identifying information and the number of times of forwarding included in the control information.

11. The communication method according to claim 10, wherein the transmitting and receiving includes
   acquiring the terminal identifying information, the initial-forward-destination-terminal identifying information, and the information for the number of times of forwarding registered in the routing information; and
   transmitting the control information after adding one to the number of times of forwarding acquired.

12. The communication method according to claim 11, wherein when a value obtained by adding one to the number of times of forwarding included in the control information exceeds a predetermined value, the transmitting and receiving includes discarding the control information.

* * * * *